INVENTOR
THOMAS J. SCARPA
BY Cyrus D. Samuelson
ATTORNEY

United States Patent Office 2,995,689
Patented Aug. 8, 1961

2,995,689
ULTRASONIC CONTROL CIRCUIT
Thomas J. Scarpa, Metuchen, N.J., assignor to Gulton Industries, Inc., Metuchen, N.J., a corporation of New Jersey
Filed Oct. 13, 1958, Ser. No. 767,055
10 Claims. (Cl. 318—37)

This relates in general to the control of mechanically vibrating systems, and more particularly to the frequency control of an electromechanical transducing unit, or a plurality of such units driven from a single source of power.

In a system in which one or more electroacoustic transducer elements are driven at high power levels, a problem is created by the tendency of these elements to drift from the frequency of the driving generator, under varying conditions of load, thereby causing the driven element to detune with respect to the driving frequency, and hence to operate inefficiently.

This particularly applies to ultrasonic systems of the type disclosed in my joint application with Vincent P. Farley, Serial Number 737,795, filed May 26, 1958, and assigned to the assignee hereof. The system disclosed in the above-referenced application includes a welding tool driven by a separate transducer operated from a driver oscillator. In some cases, several tools are driven from the same driver oscillator and it has been found in such an arrangement that each of the separate welding tools encounters a different degree of friction in relationship to the work, thereby differentially loading the several transducers. Moreover, there are other factors, such as individual differences in the mechanical impedances of the transducers and the associated structures, which cause them to detune relative to the driving frequency, and thereby to sustain substantial reductions in vibrational output power. It will be apparent to those skilled in the art that similar problems are presented, to a greater or lesser degree, in any ultrasonic system which includes a plurality of transducers driven synchronously, or even in one which includes a single transducer and the driving oscillator thereof.

Accordingly, it is an important object of this invention to improve the efficiencies of vibratory systems, and more specifically, systems comprising a plurality of transducers or resonant elements driven at the same or closely adjacent resonant frequencies.

A further object of the invention is to more uniformly control the vibrational output energies in the individual transducer units of such a system. A still further object of the control system of the present invention is to facilitate the production of more uniform and better quality welds.

These and other objects are realized, in accordance with a preferred embodiment of the present invention, in relation to an ultrasonic system which comprises a plurality of transducers driven from a single driving source, wherein the vibrational outputs of each of the respective transducer elements are successively sampled, and the samples utilized to control the central frequency of the driving oscillator so as to reduce power losses due to detuning of the individual transducers with respect to their resonant frequencies.

More specifically, this is carried out in the following manner.

The driving oscillator is caused to periodically scan a small range of frequencies which is symmetrical with respect to the central resonant frequency. The amplitude variation, in the respective transducer output voltages, when at resonance, or slightly off resonance, imposes amplitude-modulations on the generated carrier wave, in addition to the frequency modulations imposed by the frequency sweep. The amplitude-modulated, frequency-modulated carrier wave is impressed on a circuit including a balanced discriminator, which detects an amplitude-modulating envelope. The positive and negative portions of the discriminator circuit are alternatively blanked, in synchronism with the frequency sweep of the oscillator. Depending on whether the transducer whose output is sampled is above, or below, the central resonant frequency of the oscillator, the unbalanced positive or negative voltage output of the discriminator circuit is utilized in a saturable-core reactor, to vary the control frequency of the oscillator, in such a direction as to reduce the discriminator output to a minimum.

Moreover, the resonant transducer systems driven at high power levels generally have a low figure-of-merit or "Q," and accordingly lack a sharp resonant response. In view of this, an additional feature is incorporated in the preferred embodiment of the present invention, to avoid the necessity of wide frequency excursions by the oscillation generator to derive a modulation of practicable amplitude. This involves employing an expander circuit, ahead of the discriminator, which functions to exaggerate the apparent resonant responses, thereby providing a signal having sufficient amplitude variation to make the automatic frequency control circuit properly operative, even when the frequency sweep of the oscillation generator is small.

A particular advantage of the automatic frequency control system of the present invention, as used in conjunction with the welder of the type disclosed in the aforementioned application Serial Number 737,795, is that it carefully controls the output energy dissipated by the welding tool, thereby producing welds which are of uniformly high quality.

When several welding tools are driven from a single oscillator, a plurality of monitor circuits are provided corresponding to each of the transducers, which respond to a reduction in the amplitude of the feed-back signal from any one of the transducers below a preselected level to operate a relay circuit which functions to cut off the oscillation generator, causing the welding operation to cease.

These and other objects, features and advantages of the present invention will be apparent from a detailed study of the specification with reference to the attached drawings, in which:

FIGURE 1 is a diagram showing the manner in which FIGURES 2 and 3 are combined to present the overall circuit schematic of a preferred embodiment of the present invention;

FIGURES 2 and 3 show in detail the combination indicated in toto in FIGURE 1;

Figures 1, 2:
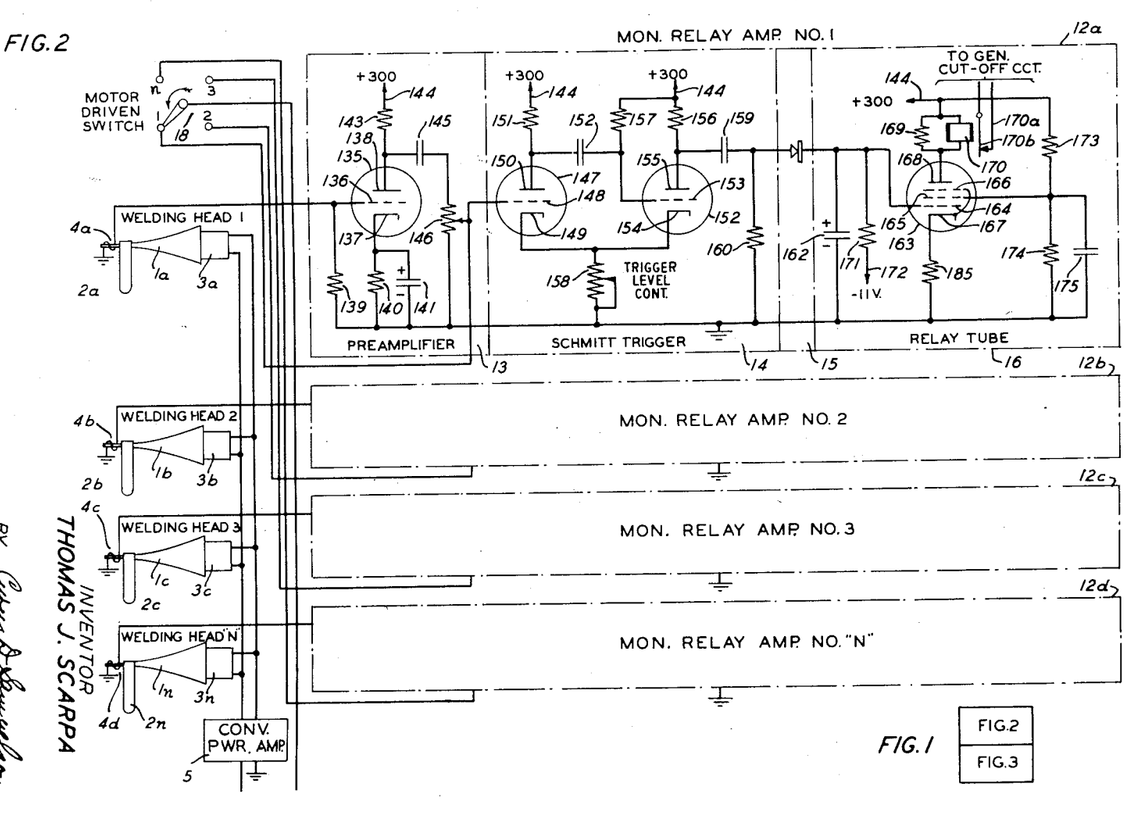
Figure 3:
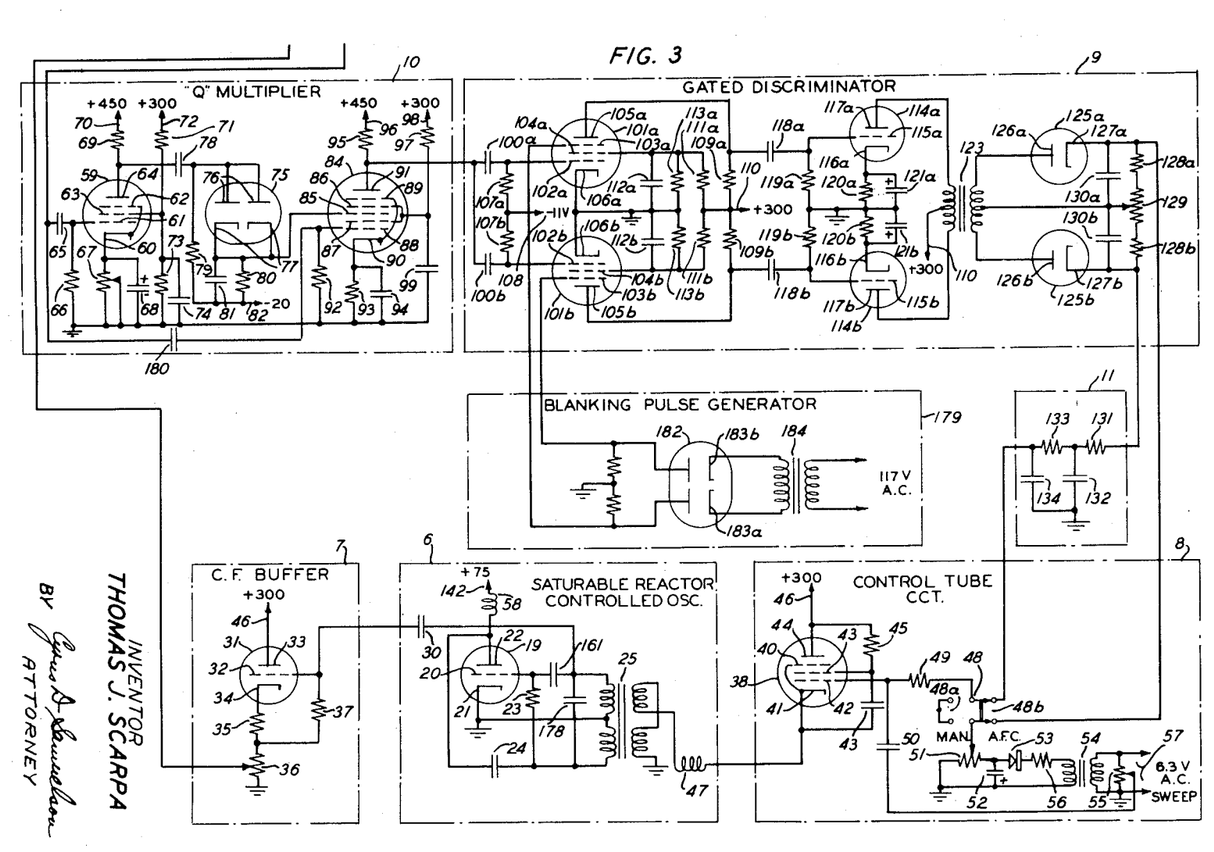

For the purpose of the ensuing detailed discussion of the circuit structure, FIGURES 2 and 3, arranged as indicated in FIGURE 1, show a preferred arrangement of the feed-back circuit of the present invention for controlling the frequencies of each of a plurality of welding tools in synchronous operation, so that each of the welders operates at a maximum efficiency to produce welds of uniform character.

Circuit theory

The problem arises, in driving sonic transducer systems including a plurality of transducers at high power levels, of eliminating or greatly reducing the drift in the resonant frequency of the system under varying loading conditions. Although each of the transducers may be chosen to have an initial resonant frequency within very close tolerances with respect to the others, complications arise, nevertheless, since the amount of acoustical loading presented to each under dynamic conditions is generally not identical. Moreover, even were such the case, the amount of detuning undergone by each transducer under load would not necessarily be the same.

The present invention provides a method of automatically controlling the oscillation frequency of an electronic sonic power generator which is driving one, or several resonant transducer systems simultaneously. In brief, the mechanical oscillations of the resonant transducer system are converted, by means of an untuned pick-up transducer, into an electrical feed-back signal which is operated upon by the circuitry under description to so vary the oscillator frequency that the transducer system is constantly driven at its resonant frequency, even though the said resonant frequency is varying under dynamic loading conditions.

In driving multiple transducers, the automatic frequency controlling circuit is rapidly switched to each, dwelling upon one-at-a-time; and the generator frequency is automatically varied to the resonant frequency of the particular system being switched in. A unique advantage of the method employed in accordance with the present invention, is that it sweeps the driving frequency above and below a center frequency at a constant rate, providing a narrow-band, frequency modulation. The deviation ratio of the oscillation generator is so set, that only the lower order sidebands, generally the first and second, are of significance, and are very close to the center frequency. This causes the transducer array to be driven with a narrow spectrum of frequencies, the center frequency of which is controlled to the resonant frequency of the transducer whose feed-back signal is being switched into the automatic-frequency control circuit, with sufficient energy in the side-bands to maintain the drive to the other transducers, should they resonant at a slightly different frequency.

Figure 5A:
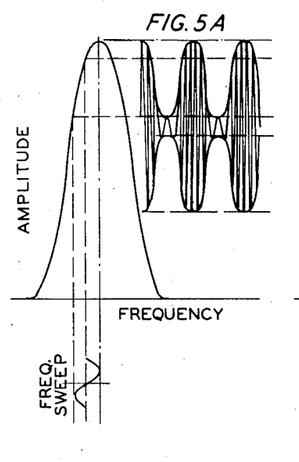
FIGURES 5A, 5B, and 5C are diagrams indicating the forms of typical modulated output voltages derived from the pick-up devices attached to each of the welding transformers, when the vibrating frequency is respectively above, on, and below the resonant frequency of the system.
Figure 5B:
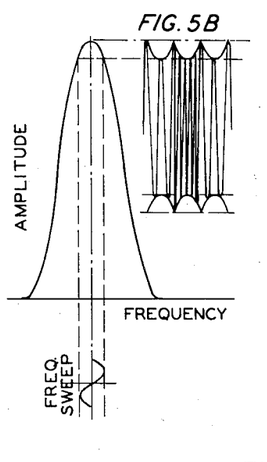
Figure 5C:
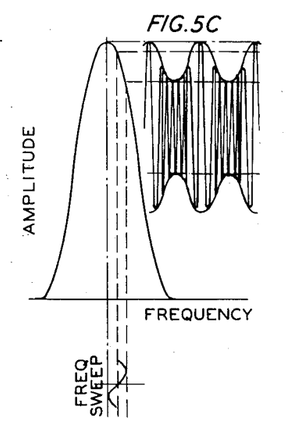

The operating principle of this circuit utilizes the slope of the response curve of the transducer to derive an amplitude-modulated frequency-modulated wave from one that is merely frequency-modulated. FIGURES 5A, 5B and 5C respectively show, in each case, the response curve of a typical electroacoustical transducer and associated vibrating system, of the type utilized in the embodiments under description. Also shown is the resultant amplitude-modulated, frequency-modulated wave that is obtained when such a transducer is driven with a frequency-modulated wave whose center frequency is either below, on, or above the resonant frequency.

The feed-back signal so derived passes through a circuit which recovers the amplitude-modulating signal from the positive envelope. A discriminator, gated by a signal of the same phase as the sweep modulating signal, senses the phase relationship of the recovered signal to that of the original amplitude-modulation. The discriminator develops a direct-current control voltage which is positive, zero or negative depending upon whether the carrier frequency is below, on, or above the resonant frequency of the transducer system. This direct-current control signal is applied to the grid of the control tube of a saturable-reactor-controlled oscillator, and so varies the oscillator frequency to maintain the discriminator output at zero.

Figure 6A:
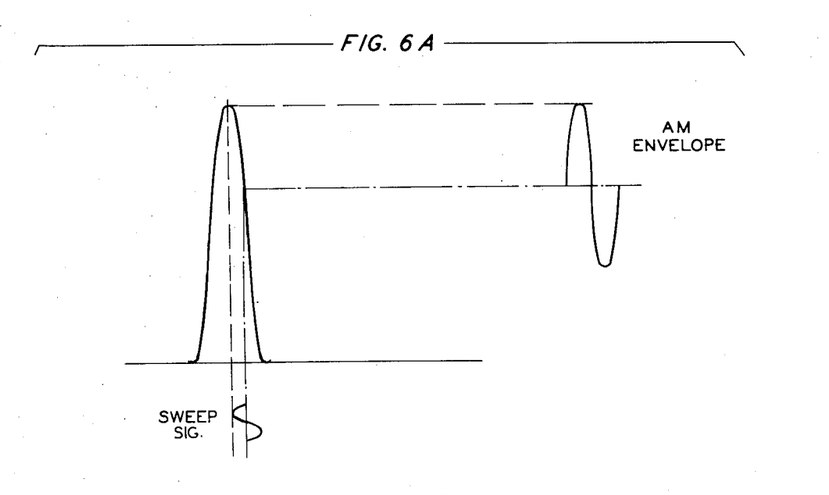
FIGURES 6A and 6B are diagrams showing the function of the expander circuit in the system of the present invention.
Figure 6B:
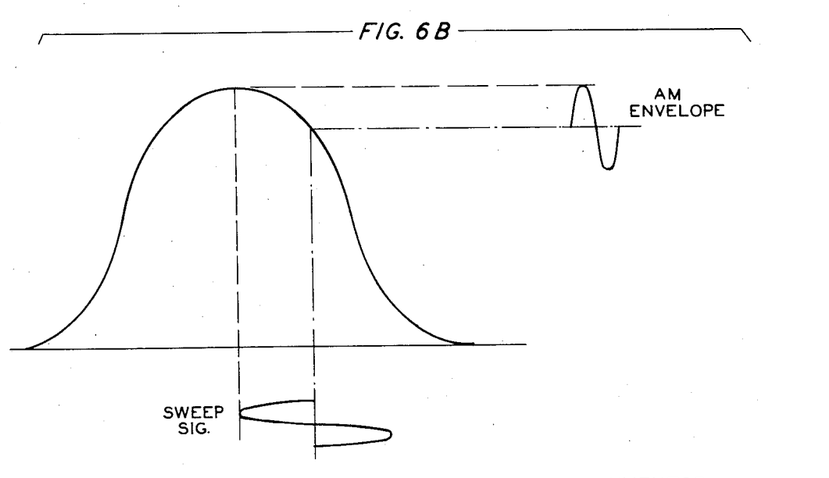

Since resonant transducer systems driven at high power levels generally have a low figure of merit or "Q," it would ordinarily be necessary to employ a large periodic frequency deviation in the oscillator to obtain an amplitude-modulated envelope of sufficient amplitude to be practicable. FIGURES 6A and 6B illustrate this problem, the former indicating the signal output derived with a relatively narrow frequency sweep across a sharp resonance curve, and the latter indicating the opposite situation, in which the resonance response of the system is relatively flatter.

If, for example, one employs a large frequency deviation, with a low modulating frequency, the deviation ratio becomes correspondingly large, and the amount of energy in the carrier is reduced drastically, since it becomes distributed in the sidebands. This results in a reduction in the over-all efficiency of the system, and is not tolerable in practical applications. If a higher modulating frequency were used so as to reduce the deviation ratio, with a large frequency deviation, then the first and higher order side-bands would be far removed from the carrier-frequency, and their energy content would represent efficiency loss.

In order to make the circuit operate more efficiently with low-Q transducer systems, and to employ a low frequency modulating signal in combination with only a small frequency deviation, for the purpose of retaining most of the energy either in, or very close to, the carrier frequency, the feed-back signal is first applied to an expander circuit which functions as a Q-multiplier. This Q-multiplier expands the amplitude variations sufficiently to make the automatic-frequency-circuit practicable, even though only a small frequency deviation is employed.

Circuit structure

The welding heads, which are respectively designated $1a$, $1b$, $1c$, ... $1n$, comprise solid impedance transforming horns of the type disclosed, for example, by W. P. Mason, Patent 2,573,168, issued October 30, 1951, each horn in combination with a tuned welding tool. Each of these solid horns $1a$, $1b$, $1c$, ... $1n$ is driven in longitudinal acoustic vibration by a corresponding ultrasonic generator $3a$, $3b$, $3c$, ... $3n$, which comprises, in each case, an array of four solid cylindrical piezoelectric transducers, stacked together with their flat, circular ends aligned in the same plane, and so that the centers of the cylinders are approximately at the corners of a square.

In the illustrative examples under discussion, each of the solid cylindrical transducers employed in the transducer arrays $3a$, $3b$, $3c$, ... $3n$ has an overall radius of 1.4 inches and an axial length of 4¼ inches and is formed of a ceramic material consisting essentially of barium titanate processed in the manner disclosed in detail in Glenn N. Howatt Patent 2,625,663, issued January 13, 1953.

However, it will be apparent to those skilled in the art that the transducers are by no means limited to the specific forms shown, but may assume any of the forms of electromechanical elements well-known in the art which are designed to vibrate mechanically in a resonant mode.

In the particular welding system under description, the transducers are designed to impart a longitudinal-mode of vibration to the large cross-sectional end of the respective impedance-transforming horn.

The ends of the respective cylindrical transducers are fastened in place on the flat surface of the large end of the corresponding impedance-matching horn by means of any good acoustic-transmitting medium which bonds well both to ceramic and to metal. In the present illustrative embodiment, an epoxy resin is employed which is adjusted at room temperature to have a viscosity of the order of 500 centipoises, and to which a hardening agent, such as diethylene triamine has been added to cause the bond to cure at room temperature.

The welding tools 2a, 2b, 2c, . . . 2n, the ends of which are actually in contact with the work, are welded, or otherwise integrally fastened to the small end of the respective impedance transforming horns, 1a, 1b, 1c, . . . 1n, so that they are respectively perpendicular to the principal axis of the horn, in each case. The impedance transformers are designed to be a full wave-length in the vibrating frequency of the generators 3a, 3b, 3c, . . . 3n, the junction with the tools, in each case, being at one antinode, or point of maximum particle velocity, and the bond between the large end of the impedance transformer and the transducers being at the other antinode. A support for the impedance transformer is placed at a nodal point between the two antinodes. The welding tool, which, in each case, extends a half wave-length between the small end of the transformer and the welding work, is designed or tuned to vibrate in shear-mode, in a manner set forth in detail in the aforementioned application Serial Number 737,795.

The aforesaid tools 2a, . . . 2n, and accompanying welding head assemblies, have been designed specifically for operation in welding systems utilizing a plurality of tools driven by a single oscillator. However, the control circuit of the present invention is not to be construed as confined to the specific circuit application disclosed herein by way of illustration, but will be understood by those skilled in the art to be applicable to numerous other types of ultrasonic systems.

Each of the transducer arrays 3a, 3b, 3c, . . . 3n, associated with a particular welding-tool assemblage, is driven to vibrate longitudinally by means of a generator which comprises a saturable-reactor-controlled oscillator 6, in combination with a cathode-follower buffer circuit 7, and a conventional, two-kilowatt power amplifier 5. The frequency of the saturable-reactor controlled oscillator 6 may either be manually adjusted in a conventional manner by means of a potential divider 51, or alternatively, electronically controlled through a feed-back circuit, by means of pick-up voltage derived directly from each of impedance transformers 1a, 1b, 1c, . . . 1n, from a corresponding one of the feed-back transducers 4a, 4b, 4c, . . . 4n.

Inasmuch as the welding assemblage comprises several resonant systems, there are several points from which such a feed-back signal may be obtained. The pick-up device for the feed-back signal must essentially comprise a broadly tuned transducer with linear response within the frequency range over which control is desired. This pick-up transducer may be any of the conventional types, that is, electrorestrictive, piezoelectric, electromagnetic or capacitive.

Figures 4A, 4B, 4C:
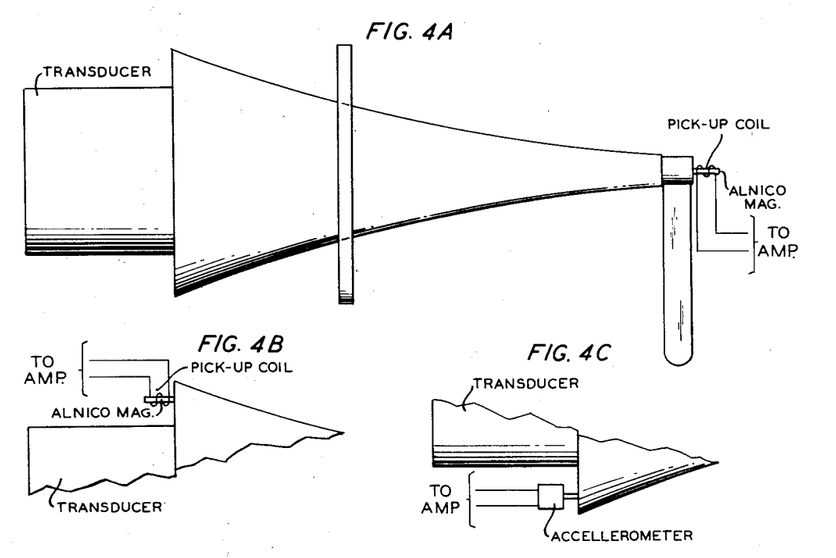
FIGURE 4A shows schematically a transducing horn combined with a welding tool of the type disclosed in detail in application Serial Number 737,795, supra, including an inductance-type pick-up device.
FIGURE 4B shows an alternative positioning of the pick-up device on the horn in FIGURE 4A.
FIGURE 4C shows an alternative type of pick-up device to the one utilized in FIGURES 4A and 4B.

FIGURE 4A, for example, is a detailed showing of one of the welding horns 1a, to the broad end of which is connected an electromagnetic pick-up device 4a. This comprises, for example, a solenoid of 5000 turns, one end of which is grounded, and the other end of which is connected to the preamplifier circuit 13. A core of Alnico 5, or a similar magnetic material characterized by a high maximum energy product, is welded or otherwise rigidly attached to an antinode on horn 1a, so that it moves axially in the associated solenoid.

The principal requirement for the location of the feed-back transducer 4a, 4b, 4c, . . . 4n, is that it be at some point in the resonant vibrating system at which the vibrations reach a maximum amplitude in phase with the vibrations of the welding tool.

Since, in the illustrative embodiment set forth in detail in application Serial Number 737,795, supra, the welding tool is designed to be a half-wave-length in shear-mode, in the resonant frequency of the transducer, either extremity of this tool will suffice as a pick-up point, as these points become antinodes at resonance. Similarly, the welding horn to which the tool is attached is designed to be a full wave-length in the longitudinal mode, in the same resonant frequency of the transducer; hence, either of its extremities may be used as pick-up points, the small end, as indicated in FIGURE 4A, or alternatively, the large end, as indicated in FIGURE 4B.

Another alternative embodiment is indicated in FIGURE 4C of the drawings, which shows a conventional accelerometer connected to respond to the vibrational energy at the large end of the impedance horn. In this case, the accelerometer is modified to respond to an acceleration which is normally in the range five hundred to a thousand times that of the acceleration of gravity.

Referring again to FIGURE 4A, the nodal flange support for the horn is connected to the half-wave point, which is at zero velocity in the direction parallel to the mode of propagation of the longitudinal wave, but is at maximum velocity in a plane normal to the direction of propagation. This nodal point could also be utilized for the placement of the pick-up transducer.

The signal circuits from each of the pick-up elements 4a, 4b, 4c, . . . 4n, are respectively directed to a corresponding one of the monitor relay circuits 12a, 12b, 12c, . . . 12n, only one of which, 12a, is shown in detail, inasmuch as each of the other circuits is similar. The monitor circuit 12a includes, as shown in the dotted enclosures, preamplifier circuit 13, Schmitt trigger circuit 14, rectifier 15, relay-amplifier 16, and cut-off switch 17, which is directly connected to the generator 7 to cut off the power, should the feed-back signal amplitude fall beneath a desired level.

Structure of the various component circuits will be described in detail as follows.

The oscillation generator circuit includes the oscillator 6, of the Hartley type, the tank coil of which is a saturable-core reactor. The active element of oscillator 6 is a triode 19 having control-grid 20, grounded-cathode 21, and plate 22, the latter being positively energized from the 75 volt source 142 through the 1.5 henry inductance 58. The control-grid 20 is coupled through the 500 micromicrofarad capacitor 161 to the secondary coil of the saturable-core transformer 25, across which is connected the 0.01 microfarad capacitor 26. The center-tap of the secondary of transformer 25 is grounded; and its negative terminal is coupled to the plate 22 through the 0.002 microfarad capacitor 24. The grid 20 is also connected to the negative terminal of the secondary of transformer 25 through the one megohm grid-leak resistor 23.

The twin primary coils of the saturable-core transformer 25 are connected in series-cancelling relation through the 150 millihenry inductance coil 47, to the cathode 41 of the tube 38 in the frequency-control circuit 8. This causes the alternating current components to cancel out. In addition to the cathode 41 of the tube 38, this tube includes plate 44, which is positively energized from the 300 volt source 46, a suppressor grid 40 directly connected to cathode 41, and a control grid 42. The latter is connected through the 100,000 ohm resistor 49 to one of the common poles of double-pole, double-throw switch 48.

The other common pole of switch 48 is connected through the 50,000 ohm potential divider 51, to the output of the conventional sweep circuit 57. Potential divider 51 is connected across the 10 microfarad capacitor 52; and the latter, in turn, is connected to ground across rectifier 53, in series with the 68,000 ohm resistor 56, and the secondary of transformer 54. The primary of the latter is connected across a 6.3 volt alternating-current source, in parallel with a 5000 ohm resistor 55, the slider on which is coupled through a 0.0005 microfarad capacitor 50 to bias control-grid 42 in tube 38.

One pair of contacts 48a of switch 48 is connected through a strap to the slider on potentiometer 51 for manual adjustment of the bias on grid 42.

The other pair of contacts 48b is connected to receive the output voltage of the automatic frequency control circuit which includes the Q-multiplier circuit 10, the gated-discriminator circuit 9, and the associated blanking circuit 179.

The saturable-reactor oscillator 6 is coupled to grid 32 of cathode-follower buffer amplifier 7 from the positive terminal of the secondary coil of transformer 25 through the 0.01 microfarad capacitance 30. The positive terminal is also connected directly to the grid 20 of triode 19 through the 500 micromicrofarad capacitance coupling 161. The triode 31 includes, in addition to control-grid 32, a plate 33 which is positively energized from the 300 volt source 46; and a cathode 34, which is connected to ground through the 680 ohm fixed resistor 35 in series with the 50,000 ohm variable resistor 36. Control-grid 32 is directly coupled to the junction of resistors 35 and 36 through a one megohm grid-leak resistor 37. The slider on the potential-divider 36 is connected to the terminal of the conventional power amplifier 5, which may be any of the types well-known in the art. The output terminals of the power amplifier 5 are connected in parallel to drive the piezoelectric transducer assemblies 3a, 3b, 3c . . . 3n.

Each of the pick-up devices 4a, 4b, 4c, . . . 4n, previously described with reference to FIGURES 4A, 4B, and 4C of the drawings, is connected to the preamplifier circuit 13 in the corresponding one of the monitor circuits 12a, 12b, 12c, . . . 12n.

The feed-back circuit from output to input of each of the respective transducer assemblies is connected in succession to the preamplifier circuit 13 in monitor relay circuits, by means of the rotating switch 18. As previously set forth, this feed-back circuit includes, in addition to the preamplifier circuit associated with each pick-up device, Q-multiplier circuit 10 and balanced, gated-discriminator 9, connected in cascade to the input of the center-frequency control circuit 8.

The preamplifier circuit 13 comprises a triode 135, which includes a control grid 136, connected to ground through the 470,000 ohm grid-leak 139. In each of the circuits, the grid 136, or its equivalent, is connected directly to the appropriate pick-up elements 4a, 4b, 4c, . . . 4n on one of the welding assemblages 1a, 1b, 1c, . . . 1n. In addition to the grid 136, the triode 135 includes a cathode 137 which is connected to ground through the 150 ohm resistor 140, by-passed by the 4 microfarad capacitor 141. The plate 138 is positively energized by the 300 volt source 144 through the 10,000 ohm resistor 143. The plate 138 is connected to pass its alternating current output through the .01 microfarad coupling capacitor 145 to ground, through the 500,000 ohm resistor 146.

A slider on the latter is directly connected to one of the terminals of the rotating switch 18, the other of whose contacts are similarly connected in the preamplifier circuits 13 associated with each of the other pick-up elements 4b, 4c, . . . 4n.

It is understood that switch 18 may assume any of the forms well-known in the art, either mechanical, electrical, or electronic, which is capable of making a series of contacts in succession. The rotating contact of switch 18 is in constant contact with Q-multiplier circuit 10.

The Q-multiplier circuit 10 includes a pentode 59 having a control grid 61, a suppressor grid 62 which is directly connected to the cathode 60, a plate 64 which is positively energized from a 450 volt potential source 70 through a 47,000 ohm resistor 69, and a screen grid 63 which is positively energized from a 300 ohm volt potential source 72 through a 47,000 ohm resistor 71.

The control grid 61 is coupled to receive input energy from the motor-drive switch 18 through a .01 microfarad coupling capacitor 65 across a 1 megohm grid-leak resistor 66. The cathode 60 is connected to ground through a 250 ohm variable resistor 67, which is shunted by a 10 microfarad capacitor 68. The screen grid 63 is connected to ground through a 47,000 ohm resistor 73, by-passed by a .01 microfarad capacitor 74.

The output from the plate 64 is coupled through .01 microfarad capacitor 78 to the twin-plates 76 of a double diode 75. A 150,000 ohm resistor 79 is connected from the twin plates 76 to the negative terminal of the 20 volt biasing source 82. The twin-cathodes 77 are also connected to the negative terminal of biasing source 82 through a 50,000 ohm resistor 80, which is by-passed by a .01 microfarad capacitor 81. The cathode-resistor 80 of the twin diodes 75 is connected to impress its output voltage on the control grid 85 of a heptode 84.

In addition to the control grid 85, the latter also includes twin screen grids 86 and 87, which are positively energized from the 300 volt source 98 through the 22,000 ohm resistor 97; and plate 91, which is positively energized from the 450 volt source 96 through the 47,000 ohm resistor 95. The suppressor grid 89 is directly connected to the cathode 90. The latter is connected to ground through a 680 ohm cathode resistor 93, which is by-passed by a .10 microfarad capacitor 94. An additional grid 88, which is connected across a 470,000 ohm resistor 92 to ground, is coupled back to the rotating arm of switch 18 through the .01 microfarad capacitor 180. The twin-screens 86 and 87 of heptode 84 are connected to ground through the .01 microfarad capacitor 99.

The input stages of the gated-discriminator circuit 9 are connected in parallel across the plate 91 through a pair of .01 microfarad coupling capacitors 100a and 100b, which are respectively connected to the control grids 102a and 102b, of the push-pull pentodes 101a and 101b. Each of the aforesaid control grids is biased negatively by connection to the negative terminal of an 11 volt source 108 through the respective 470,000 ohm resistors 107a and 107b, in parallel. In addition to the control grid, the push-pull pentodes 101a and 101b includes cathodes 106a and 106b, which are connected together to ground; screen grids 104a and 104b, each of which is energized positively by connection to the 300 volt source 110 through circuits which respectively include the 15,000 ohm resistors 111a and 111b. The latter screen grids are also connected to ground through 47,000 ohm resistors 113a and 113b, across by-passing .01 microfarad capacitors 112a and 112b. The plates 105a and 105b are respectively positively energized from the same 300 volt source 110, through parallel resistors 109a and 109b, each of 22,000 ohms.

The third grids, 103a and 103b in each of the tubes 101a and 101b, are respectively connected to opposite terminals of blanking-pulse circuit 179. The latter includes the double-diode 182, the twin plates of which are each connected to ground across 47,000 ohm resistors, the plates being respectively connected to grids 103a and 103b. The twin cathodes 183a and 183b of double-diode 182, are connected across opposite terminals of the primary coil of transformer 184, the center tap of which is grounded. The secondary of the latter is symmetrically connected across a 117 volt alternating current source, which is synchronized with the sweep signal source 57.

The twin plates 105a and 105b of tube 101a, 101b are coupled through the respective .01 microfarad capacitors 118a and 118b to the control grids 115a and 115b of the push-pull triodes 114a and 114b, across the 470,000 ohm grid-leaks 119a and 119b.

The triodes 114a and 114b respectively include cathodes 116a and 116b, each connected through 100 ohm resistances 120a and 120b, to ground, by-passed, in each case, by a 10 microfarad capacitor 121a, 121b. The plates 117a and 117b of the triodes 114a and 114b are connected to opposite terminals of the primary coil of transformer 123, the center tap of which is connected to the positive terminal of the 300 volt source 110.

The secondary of transformer 123 has its opposite terminals connected to the plates 126a and 126b of the push-pull diodes 125a and 125b, each of the cathodes 127a, 127b of which are connected to the respective 50,000 ohm fixed resistors 128a and 128b which are connected together in series with a 20,000 ohm resistor 129. A slider on the latter is connected to the center tap of the secondary coil of transformer 123.

The cathode resistors are respectively by-passed by .01 microfarad capacitors 130a and 130b which are joined to the center tap of the secondary of transformer 123.

The output circuits of the push-pull diodes 125a and 125b are connected through a filter circuit 11, which includes the 68,000 ohm resistor 131, in series with the 39,000 ohm resistor 133, the junction of resistors 133 and 131 being connected to ground by the .5 microfarad capacitor 132, and the other terminal of the resistor 133 being connected to ground through the 1 microfarad capacitor 134. The output terminal of the aforesaid filter circuit is connected across the terminals 48b of the double-pole, double-throw switch 48, the common poles of which are respectively connected to the grid of control tube 38, and to sweep-width control circuit 57, as previously described.

Turning now to the monitor relay circuit 12a, inasmuch as this is identical with the circuits 12b, 12c, . . . 12n, the latter will not be described in detail. Circuit 12a comprises several stages which include the preamplifier 13 (previously described in the discussion of the feed-back circuit), Schmitt trigger 14, rectifier 15, relay amplifier 16, and associated relay 170. The latter functions to open the high voltage power supply circuit to the power amplifier, cutting off the generator.

In the next stage, after preamplifier 13, which is the Schmitt trigger circuit 14, the grid 148 of triode 147 is connected to one of the terminals of the motor driven switch 18, the rotating wiper of which is connected through the feed-back circuit including Q-multiplier circuit 10 and the gated-discriminator circuit 9 to the input terminals of the oscillator 6, as previously described.

The Schmitt trigger circuit includes a pair of parallel stages, connected for trigger action. These include the triodes 147 and 152, cathodes 149 and 154, which are connected together through the 5,000 ohm variable resistor 158 to ground. The plate 150 of the tube 147 is positively energized by connection to the 300 volt source 144 through 150,000 ohm resistor 151. The plate 155 of the tube 152 is also positively energized from the 300 volt source 144, through the 22,000 ohm resistor 156. Plate 150 of triode 147 is connected to grid 153 of the triode 152 through a .005 microfarad capacitor 152, the latter being connected to the positive terminal of 300 volt potential source 144, through the 470,000 ohm resistor 157. The plate 155 is coupled through .01 microfarad capacitor 159 to the high potential terminal of a 470,000 ohm output resistor 160, the other terminal of which is grounded.

Positive terminal of resistor 160 is also connected, in the direction of the easy flow, to one terminal of the rectifier 15, the other terminal of which is connected across the 4 microfarad capacitor 162 to the control grid 164 of the pentode 163, in the relay amplifier circuit 16. The grid 164 is biased negatively through a 470,000 ohm resistor 171 connected to an 11 volt bias source 172. The cathode 167 of tube 163 is connected to ground through the 100 ohm resistor 185, the suppressor grid 166 being connected directly to the cathode 167. The plate 168 is positively energized through a 10,000 ohm resistor 169, connected to the 300 volt source 144. Screen grid 165 is also positively energized from the same source through the 33,000 ohm resistor 174, which is by-passed by the .01 microfarad capacitor 175. The current from the plate 168 is utilized to energize the electromagnetic relay coil 170, which actuates the contacts 170a and 170b. The latter are interposed in energizing circuit of the conventional amplifier 5, for the purpose of cutting off the flow of energy from the oscillator 6 to the piezoelectric generators 3a, 3b, 3c, . . . 3n, when the monitor relay circuit 16 is energized.

*Circuit operation*

In order to monitor the frequency of the welding assemblage, the automatic frequency-control circuit requires a feed-back signal from the welding heads, whose amplitude varies directly as the amplitude of vibration of the latter. Such a signal permits the control circuitry to sense when the transducer is vibrating at maximum efficiency.

As previously described with reference to FIGURES 4A, 4B, and 4C, this signal is derived from one of the pick-up elements 4a, 4b, 4c, . . . 4n, on a corresponding one of the impedance horns.

In operation, the frequency of the oscillator 6 is set so that the power amplifier 5 drives the welding heads 4a, 4b, 4c, . . . 4n close to the resonant frequency of the transducer arrays, which, for the present illustrative embodiment, is about twenty kilocycles.

A small amplitude sweep signal is applied to the grid 42 of the oscillator control tube 38, so as to periodically sweep this frequency through the resonant frequency of the welding assemblage. The amplitude of this sweep signal, which in the present illustrative embodiment is derived from the 6.3 root-mean-square alternating current 60-cycle source, is adjusted by means of a potentiometer 55 so that the frequency deviation of only plus or minus 10 cycles from the center frequency of the assemblage is obtained. This produces a feed-back signal in the selected pick-up transducer 4a, 4b, 4c, . . . 4n which in addition to being frequency-modulated is also amplitude-modulated in accordance with the sweep signals, due to the slope of the response curve of the transducer as described in detail with reference to FIGURES 5A, 5B, and 5C. The feed-back signal from respective pick-up device 4a, 4b, 4c, . . . 4n is applied through the corresponding preamplifier 13 to one of the contacts of the rotating switch 18.

Thus, the pick-up signal from each of the welding tools is applied, in succession, through the corresponding feed-back circuit, to the grids of tubes 59 and 84 simultaneously. Tube 59 functions to amplify the feed-back signal, which is fed through coupling capacitor 78 to double-diode 75, where it is rectified. The ensuing direct-current signal from tube 75 then varies in amplitude in accordance with the amplitude of the modulating envelope upon the feed-back signal. This varying direct-current voltage is applied to an auxiliary control-grid 85 of tube 84, which serves to vary the trans-conductance of this tube.

The application of both signals to the control-grids 85 and 88 of tube 84 produces a non-linear amplification characteristic in this tube, such that the gain is increased with stronger signals and decreased with weaker signals. This function serves to separate the amplitude of the modulation envelope with respect to the amplitude of the carrier in the feed-back signal. The signal so expanded is then fed simultaneously to the control grids 102a and 102b of pentodes 101a and 101b, which are biased to cut-off, so that plate-detection ensues.

Tubes 101a and 101b are additionally gated to cut-off, by a gating signal applied to their suppressor grids 103a and 103b, which is of the same phase as the sweep signal applied to control tube 38. This arrangement renders tube 101a conducting on only one polarity of the sweep signal, and tube 101b conducting on the opposite polarity of the sweep signal. Since the feed-back signal is applied simultaneously to the grids 102a and 102b of both tubes 101a and 101b, this gating signal enables discriminator circuit 9 to determine on which slope of the transducer response curve the center frequency is operating.

When the center frequency is exactly on the peak of the transducer response curve, both tubes will develop current pulses in accordance with the sweep signal. When the center frequency is down upon either the negative or positive slope of the transducer response curve, either one or the other of tubes 101a and 101b will develop voltage pulses much larger in amplitude than that of the other tube. These voltage pulses are respectively coupled by means of capacitors 118a, 118b to the grids of 115a, 115b of tubes 114a and 114b where they are amplified in the primary circuit of discriminator transformer 123 which is in each of their plate circuits. The pulses are rectified in the secondary circuit of the discriminator transformer 123 by double-diode 125a, 125b.

The purpose of returning the center-tap of load resistor 129 in the twin diode circuits 125a and 125b to the center tap of the secondary of discriminator transformer 123, is so that the polarity of the signal developed at each diode cathode will be determined by the direction of current flow in the primary circuit of the balanced discriminator transformer 123. When both tube 101a and tube 101b develop equal pulses, 126a and 126b will also develop equal direct-current voltages. In this case, the voltage output taken from cathode to cathode of diodes 125a and 125b will be zero, as the individual output of each diode will cancel the other.

Should one or the other of tubes 101a and 101b develop strong pulses, the output of diodes 125a and 125b will be unbalanced. The load resistors of diodes 125a and 125b are placed in series between the bias supply leading to control tube 38 so that the voltage developed across these load resistors tends either to add or to reduce the bias voltage. Under these conditions, should the resonant frequency of the transducer be different from that of the oscillator, a voltage will appear across the load resistors of diodes 125a and 125b that will so vary the bias voltage on the grid of the oscillator control tube as to cause the oscillator frequency to change so that this voltage becomes zero.

Figure 7A:
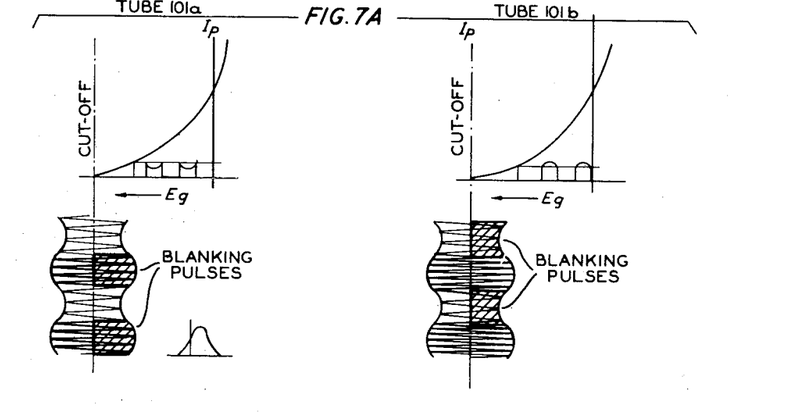
FIGURES 7A, 7B, and 7C are diagrams illustrating the operation of the discriminator circuit.
Figure 7B:
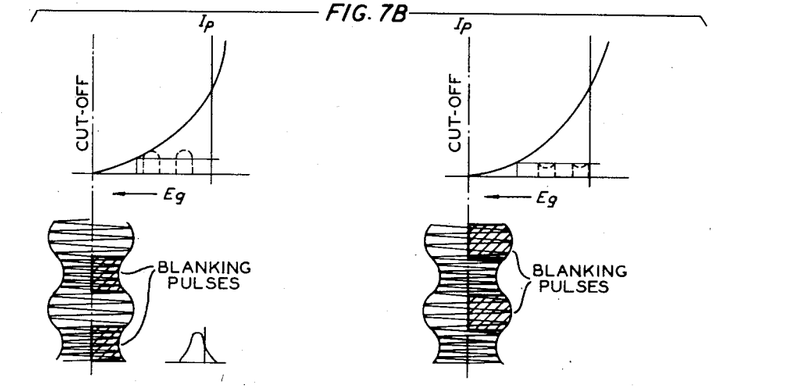
Figure 7C:
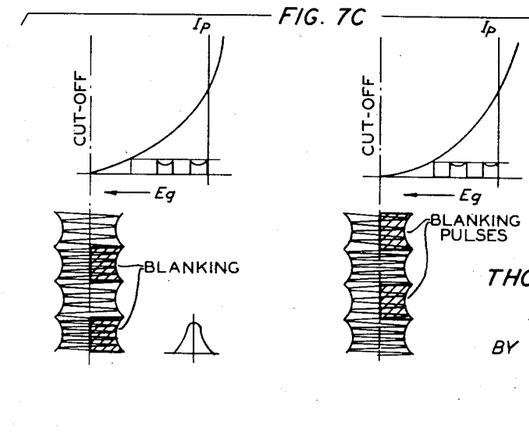

The function of the gated-discriminator, together with the double-diode circuit, is indicated more clearly in FIGURES 7A, 7B, and 7C of the drawings. FIGURE 7A indicates a first condition, under which the vibrating system is operating below the resonant frequency. Identical modulated signals are impressed on the control grids of each of tubes 101a and 101b. As indicated, blanking pulses are applied in phase opposition to each of tubes 101a and 101b, producing plate output voltages which are directly related to the phase of the amplitude modulation.

FIGURE 7B indicates the second condition, under which the vibrating system is operating exactly on resonance; and FIGURE 7C indicates the condition under which the vibrating system is operating above resonance.

It is seen that under the first and third conditions, the sum of the rectified discriminator output voltages is respectively negative or positive, whereas under the second condition, the components cancel each other. In this manner, the frequency of the oscillator is automatically controlled to that of the resonant frequency of the transducer.

As previously set forth, the welding heads are powered by the conventional two-kilometer power amplifier 5. The frequency of operation is generated by the Hartley oscillator 6, the tank coil of which is the saturable-core reactor 25, whose inductance is varied by a direct-current in its control winding, which is in series with the cathode of control tube 38, so that the current through the winding becomes a function of the grid-bias of the latter. In effect, then, the inductance of the tank coil of oscillation generator 6 is varied with the bias on the grid of the control tube 38, thereby controlling the center frequency of the said oscillation generator.

The monitor relay circuit operates as follows. If the signal derived from one of the pick-up elements 4a, 4b, 4c, . . . 4n, after passing through the preamplifier 13, is above a preselected level, the bias on tube 147 is raised above cut-off, causing tube 147 to become conducting, thereby triggering tube 152. The rectified output signal from tube 152 is amplified by the monitor relay amplifier 16, the plate output of which energizes the normally-open relay 170, to close contact 170a in the energizing circuit of power-amplifier 5. This permits application of the driving power of the electroacoustic transducer arrays 3a, 3b, 3c, . . . 3n. Should the feed-back signal fall beneath this present level, relay 170 deenergizes, cutting off the supply to the generator, and thereby causing the welding operation to cease.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. In an electroacoustic system consisting of at least one transducer and an oscillation generator for driving said transducer to vibrate substantially in a resonant mode of vibration, the combination therewith of a feed-back circuit responsive to amplitude variation in the vibrational output energy of said transducer to control the frequency output of said oscillation generator, said feed-back circuit comprising in combination a periodic sweep signal source coupled to said oscillation generator for causing the central frequency of said generator to periodically sweep over a restricted range of frequency in a manner which is substantially symmetrical with respect to the resonant frequency of said transducer, circuit means for detecting the amplitude modulation in the vibrational output of said transducer due to the detuning of said transducer with respect to said resonant periodic frequency sweep, a discriminator circuit comprising a pair of twin polarity-balanced stages, a source of blanking pulses synchronously phased with said sweep-signal and connected to blank alternate stages of said discriminator circuit in synchronism with the frequency sweep of said generator, a circuit for controlling the central frequency of said oscillation generator, a circuit connected to receive the unbalanced output voltage from said discriminator circuit and to impress said voltage on said circuit for controlling the central frequency of said oscillator, whereby the central frequency of said oscillation generator is varied in a manner to reduce the unbalanced output of said discriminator.

2. A combination in accordance with claim 1 which includes a circuit for magnifying the amplitude of the modulations of said feed-back circuit, wherein said last named circuit is interposed in said feedback circuit before said discriminator circuit.

3. In an electro-acoustic system which consists of a plurality of transducers and an oscillations generator coupled to drive said transducers at substantially the same resonant frequency of vibration, the combination therewith of an automatic frequency control circuit comprising in combination a source of sweep signals connected to drive said oscillation generator to periodically scan a selected range of frequencies extending above and below said resonant frequency, pick-up elements responsive to the amplitude-modulated vibrational output of each of said transducers, switching means connected to receive the electrical output of each of said pick-up elements in succession, an electrically balanced discriminator circuit connected to receive the output of said switching means and to detect the amplitude-modulating envelope of the amplitude-modulated frequency-modulated output waves of each of said transducers in succession, blanking means synchronized with said sweep signals for impressing oppositely phased blanking signals in alternation on the two halves of said discriminator circuit in conformity with the polarity of said sweep signal, and a magnetic core reactor connected to said discriminator circuit and to said oscillation generator for utilizing the unbalanced output from said discriminator circuit to control the central frequency of said oscillation generator in a direction to reduce the output of said discriminator circuit.

4. A combination in accordance with claim 3 in which an expander circuit is interposed between said switching means and said discriminator circuit for exponentially increasing the amplitude-modulation of the signals derived from said pick-up elements.

5. In an ultrasonic welding system which consists of at least one electroacoustic transducer, a welding tool connected to be driven in mechanical vibration by said transducer, an oscillation generator connected to drive said transducer to vibrate mechanically in a resonant mode of vibration, the combination therewith of a feed-back circuit comprising in combination a source of a sweep signal connected to said oscillation generator for causing said generator to periodically scan a range of frequencies extending above and below the resonant frequency of said transducer, pick-up means responsive to the vibrations of said transducer to produce an electrical signal having a frequency-modulated carrier corresponding to the frequency of vibration of said transducer, and an amplitude-modulating envelope which is a function of the tuning of the vibrating system including said transducer with respect to the resonant frequency of said system, means including an electrically-balanced discriminator circuit connected to receive and detect the amplitude-modulating envelope from said pick-up means, connected to said discriminator circuit and synchronized with said sweep signal for sensing the polarity of said amplitude-modulating envelope, and circuit means responsive to the unbalanced output from said discriminator circuit to vary the central frequency of said oscillation generator in a direction to reduce the unbalanced output of said discriminator circuit.

6. A combination in accordance with claim 5 which includes an exponential expander circuit interposed between said pick-up means and said discriminator circuit for substantially expanding said amplitude-modulating envelope as the central frequency of said generator approaches the resonant frequency of said transducer.

7. In a system which consists of at least one electroacoustic transducer and an oscillations generator coupled to drive said transducer in a substantially resonant mode of vibration, the combination therewith of an automatic frequency control circuit which comprises in combination means for periodically frequency-modulating the oscillating frequency of said generator about said resonant frequency at a modulating frequency which is less than about five tenths of one percent of the resonant frequency of the said transducer, pick-up means responsive to the mechanical vibrations of said transducer to generate a frequency-modulated electrical output signal which is also amplitude-modulated in accordance with the tuning of said transducer with respect to said resonant mode, means including an electrically balanced discriminator circuit for detecting the amplitude-envelope of the frequency-modulated signal derived from said pick-up means, a source of blanking pulses synchronized with and in phase with the frequency modulations of said oscillations generator for sensing the polarity of the amplitude modulations in said discriminator circuit, means for utilizing the unbalanced output of said discriminator circuit to control the central frequency of said oscillation generator in a direction to reduce the unbalanced output of said discriminator circuit.

8. A system in accordance with claim 7 wherein said automatic frequency control circuit includes an expander circuit interposed between said pick-up means and said discriminator circuit for exponentially expanding the amplitude-modulation of said signal derived from said pick-up means.

9. In an ultrasonic welding system which consists of a plurality of electroacoustic transducers, a welding tool connected to be driven in mechanical vibration by each of said transducers, and an oscillation generator connected to drive each of said transducers to vibrate substantially in a resonant mode of vibrations, the combination therewith of a feed-back circuit comprising in combination a source of a sweep signal connected to said oscillation generator for causing said generator to periodically scan a range of frequencies including a resonant frequencies of said transducers, pick-up means respectively responsive to the vibrations of each of said transducers to produce in each case an electrical signal having a frequency-modulated carrier corresponding to the frequency of vibration of said transducer, and an amplitude-modulating envelope which is a function of the tuning of each of the vibrating systems including said transducers with respect to the resonant frequency of each said systems, means including an electrically-balanced discriminator circuit connected to receive and detect the amplitude-modulating envelope from each said pick-up means, sensing means connected to said discriminator circuit and synchronized with said sweep signal for sensing the polarity of the amplitude-modulating envelope derived from each of said pick-up means, and circuit means responsive to the unbalanced output from said discriminator circuit to vary the central frequency of said oscillation generator to reduce the unbalanced output of said discriminator circuit.

10. In a system consisting of an oscillation generator and a plurality of electrical transducers having substantially the same resonant frequency driven by said generator, the combination therewith of a feed-back circuit for controlling said transducers to operate at substantially said resonant frequency, said feed-back circuit comprising in combination means for imposing on said oscillator a periodic frequency sweep for varying the frequency of said generator over a selected narrow range of frequencies including said resonant frequency, means to derive from each of said transducers an output voltage which is frequency-modulated in accordance with said frequency sweep and which is also impressed with an amplitude-modulating envelope whose magnitude and phase is a function of the tuning of said transducer relative to said resonant frequency, means comprising a balanced discriminator circuit for detecting the amplitude and phase of said amplitude-modulating envelope, and means for utilizing the unbalanced output voltage derived from said discriminator circuit for controlling the center frequency of said generator in a direction to reduce the unbalanced output of said discriminator circuit.

References Cited in the file of this patent

UNITED STATES PATENTS

| | | |
|---|---|---|
| 2,404,567 | Dow | July 13, 1946 |
| 2,469,324 | Beard et al. | May 3, 1949 |
| 2,504,831 | Griss | Apr. 18, 1950 |
| 2,553,251 | Gutterman | May 15, 1951 |